United States Patent
Manroa et al.

(10) Patent No.: US 10,517,126 B2
(45) Date of Patent: Dec. 24, 2019

(54) COMMUNICATION MANAGEMENT AND WIRELESS ROAMING SUPPORT

(71) Applicant: Time Warner Cable Enterprises LLC, New York, NY (US)

(72) Inventors: Arun Manroa, Herndon, VA (US); Qiang Zhang, Mclean, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 117 days.

(21) Appl. No.: 14/886,471

(22) Filed: Oct. 19, 2015

(65) Prior Publication Data
US 2017/0111842 A1 Apr. 20, 2017

(51) Int. Cl.
*H04W 76/11* (2018.01)
*H04W 8/18* (2009.01)
*H04W 36/00* (2009.01)
*H04W 84/12* (2009.01)

(52) U.S. Cl.
CPC ............. *H04W 76/11* (2018.02); *H04W 8/18* (2013.01); *H04W 36/0038* (2013.01); *H04W 84/12* (2013.01)

(58) Field of Classification Search
CPC ..... H04W 36/32; H04W 48/16; H04W 48/20; H04W 8/02; H04W 36/08; H04W 76/021; H04W 88/08; H04W 76/11; H04W 8/18; H04W 36/0038; H04W 84/12
See application file for complete search history.

(56) References Cited

U.S. PATENT DOCUMENTS

| | | | |
|---|---|---|---|
| 7,107,051 B1 * | 9/2006 | Walker | H04L 9/083 380/247 |
| 9,137,742 B1 * | 9/2015 | Zhu | H04W 48/18 |
| 2005/0220048 A1 * | 10/2005 | Lee | H04L 63/08 370/328 |
| 2006/0209768 A1 * | 9/2006 | Yan | H04L 29/12311 370/338 |
| 2007/0044146 A1 * | 2/2007 | Murase | G06F 21/33 726/10 |
| 2009/0055904 A1 * | 2/2009 | Gomi | H04L 63/08 726/4 |

(Continued)

*Primary Examiner* — Christopher P Grey
(74) *Attorney, Agent, or Firm* — Armis IP Law, LLC

(57) ABSTRACT

A user-operated communication device stores security association information that is initially used to wirelessly connect the user-operated communication device to a first wireless access point made available by a first private wireless network service provider. Assume that the user-operated communication device roams out of a first wireless coverage region supported by the first wireless access point into wireless range of a second wireless access point operated by a second private wireless network service provider. Instead of performing full authentication to establish a wireless communication link with the second wireless access point, the user-operated communication device requests authentication resumption and utilizes the stored security association information (provided by the first service provider) to more quickly, wirelessly connect the communication device to the second wireless access point. Accordingly, techniques herein support authentication resumption across different service providers' wireless networks.

31 Claims, 11 Drawing Sheets

(56) References Cited

U.S. PATENT DOCUMENTS

| | | | | |
|---|---|---|---|---|
| 2011/0055561 A1* | 3/2011 | Lai | ........................... | H04L 9/083 |
| | | | | 713/168 |
| 2013/0301607 A1* | 11/2013 | McCann | ........... | H04W 36/0072 |
| | | | | 370/331 |
| 2015/0264051 A1* | 9/2015 | Hoggan | .............. | H04L 63/0892 |
| | | | | 726/1 |
| 2015/0373579 A1* | 12/2015 | Xu | .................... | H04W 28/0289 |
| | | | | 370/230 |
| 2017/0156090 A1* | 6/2017 | Bhumkar | .......... | H04W 36/0061 |

* cited by examiner

COMMUNICATION MANAGEMENT AND WIRELESS ROAMING SUPPORT

BACKGROUND

Conventional computer devices typically have the ability to identify a presence of available WiFi™ access points. For example, according to current technology, to learn of one or more access points in a region, a computer device can listen for so-called beacons indicating their identities (a.k.a., SSIDs).

In addition to or as an alternative to monitoring beacons, a communication device can be configured to transmit a wireless query signal (e.g., a probe request) in a region. In response to the wireless query signal, any of one or more active WiFi™ network access points in the region will respond with information indicating their identities (a.k.a., SSIDs).

In certain instances, a respective SSID is a human-readable network name assigned to a respective network. Accordingly, via the response information from the access points, the operator of the computer or the computer itself can be configured to identify which, if any, WiFi™ networks are available for use in the region.

After identifying available WiFi™ networks, the computer device can initiate display of the identities of the different WiFi™ networks on a display screen. In such an instance, the user of the computer can manually select from a listing of the available WiFi™ networks (SSIDs) in which to connect. It is now common that software in the computer device select an appropriate SSID in which to connect.

If the WiFi™ access point is an open WiFi™ network, the user will not need to provide a password to be granted access to the Internet through the selected WiFi™ access point. Alternatively, in certain instances, such as in secured WiFi™ networks (secured SSIDs), the user may be required to provide appropriate credentials (such as username, password, etc.) to use the wireless access point. This sometimes referred to as authentication.

If used, a downside of open networks is that illegitimate users (a.k.a., hackers) can potentially eavesdrop on respective wireless communications between a computer device and a respective WiFi™ access point. Via eavesdropping, an illegitimate user may be able to learn of a respective network address associated with the computer device. Using the network address, the illegitimate user may be able to control use of the communication link and/or steal personal data. Thus, unsecured wireless communications (such as WiFi™ communications) are typically undesirable.

To alleviate and/or prevent hacking of wireless communications, several wireless communication protocols have been established for use in WiFi™ applications to provide more secured wireless communications. For example, the EAP (Extensible Authentication Protocol) is a desired protocol for use in wireless network applications. The EAP protocol expands on authentication methods used by the Point-to-Point Protocol (PPP), a protocol often used when connecting a computer to the Internet.

In general, to communicate in accordance with a wireless security protocol such as EAP, a user requests to establish a connection with a respective wireless access point (such as via the WiFi™ communication protocol). In response to receiving the request, the wireless access point requests that the user (or corresponding mobile communication device) of the communication device provide identification information. The wireless access point forwards the identification information received from the communication device to an appropriate authentication server. Via communications through the wireless access point, the authentication server challenges the user of the communication device to provide proof of the validity of the provided identification information. The wireless access point receives and forwards authentication information (such as password, etc.) received from the user to the authentication server. Based on received credentials, the authentication server authenticates the user and corresponding mobile communication device.

Successful authentication can include forwarding appropriate security information such as encryption keys to the communication device such that the communication device is able to communicate with a respective wireless access point over a secured link.

In addition to EAP services, conventional WiFi™ supports so-called Passpoint services. In general, Passpoint services allow your mobile device to connect to different wireless access points of a single service provider as the mobile device roams through a respective geographical region. For example, both a first wireless access point and a second wireless access point may support wireless connectivity for a single particular service provider. A respective user may communicate with the first wireless access point, provide appropriate credentials, receive security association information supporting communications, and then communicate through the first wireless access point to the Internet.

The respective user may roam outside a coverage region provided by the first wireless network into a wireless coverage provided by the second wireless access point. It is possible that the communication device uses a Passpoint inquiry to identify that the second wireless access point is part of a same service provider's wireless network including the first wireless access point operated by the single particular service provider. In such an instance, because the second wireless access point is part of the same network as the first wireless access point, the user operated client device is able to use the security association established with the first wireless access point to then establish connectivity with the second wireless access point. The second wireless access point provides the user access to the Internet based upon the previous security association.

BRIEF DESCRIPTION OF EMBODIMENTS

Use of conventional wireless networks suffer from a number of deficiencies. For example, according to conventional techniques, each subscriber must be authenticated by a respective service provider's authentication server prior to the subscriber being allowed to access to a respective service provider's wireless network. In such an instance, to perform a handoff or switchover from using a first wireless access point associated with a first service provider to using a second wireless access point associated with a second service provider to access a remote network such as the Internet, the communication device must first perform a full authentication with the second service provider during the handoff. This is undesirable because of the amount of time it takes to perform the full authentication of the subscriber with the second service provider.

In contrast to conventional techniques, embodiments herein enable use of previously stored credentials to provide connectivity across private wireless networks associated with different service providers.

By way of a non-limiting specific example, one embodiment herein provides authentication resumption across different service providers and corresponding service provider's networks when a client device roams out of a first wireless region supported by a first private wireless service provider and into a second wireless region supported by a second provide wireless service provider.

More specifically, in one embodiment, a user-operated communication device stores security association information previously used to wirelessly connect the user-operated communication device to a first wireless access point associated with a first private wireless network service provider. Assume that the user-operated communication device roams out of a first wireless coverage supported by the first wireless access point (operated by the first private wireless network service provider) into a second wireless coverage region supported by a second wireless access point (operated by a second private wireless network service provider).

During operation and roaming, assume that the user-operated communication device identifies presence of the second wireless access point. Instead of a performing a full authentication to establish the respective wireless communication link with the second wireless access point as required by conventional techniques, the user-operated communication device utilizes the previously stored and used security association information previously used to wirelessly connect the user-operated communication device to the first wireless access point to now wirelessly connect the communication device to the second wireless access point (associated with the second private wireless network service provider).

Accordingly, embodiments herein reuse of prior session information (security association information) for a first service provider to establish a new wireless connection and session with and through a second service provider's network.

In accordance with further embodiments, to notify the user-operated communication device of the presence and availability of the second wireless access point, the second wireless access point transmits wireless communications to the user-operated communication device indicating presence of the second wireless access point. In response to receiving the notification, the user-operated communication device generates a request to establish a wireless connection with the second wireless access point. The second wireless access point receives the request.

Prior to providing the user-operated communication device network access through the second wireless access point, the second wireless access point communicates with an authentication server associated with the first private wireless network service provider to verify prior authentication of the communication device for use of the second wireless access point by the communication device. Subsequent to verification of the user-operated communication device, and based at least in part on the prior authentication (and security association information) of the user-operated communication device with the first wireless access point, the second wireless access point provides the user-operated communication device access to a remote networks such as the Internet.

Embodiments herein are useful over conventional techniques. For example, providing a respective user-operated communication device access to a second service provider's network based on prior authentication of the user-operated communication device with a first service provider's network alleviates the need for the user-operated communication device to be validated again using a lengthy authentication process with respect to the second service provider. Instead, via authentication resumption, the second service provider relies at least partially on the prior authentication to provide the user-operated communication device access to the second wireless access point These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium (media) such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware (such as associated with a user-operated communication device), cause the computer processor hardware of the system to: store security information previously used to wirelessly connect the user-operated communication device to a first wireless access point associated with a first private wireless network service provider; identify presence of a second wireless access point associated with a second private wireless network service provider; and utilize the stored security information previously used to connect the user-operated communication device to the first wireless access point to wirelessly connect the communication device to the second wireless access point operated by the second private wireless network service provider.

Another embodiment as described herein includes computer readable storage medium, system, hardware, etc., having instructions stored thereon. The instructions, when executed by computer processor hardware (such as associated with a wireless access point), cause the computer processor hardware of the system to: transmit wireless communications indicating presence of the second wireless access point; receive a request from the communication device to establish a wireless connection with the second wireless access point; and from the second wireless access point, communicate with an authentication server operated by the first private wireless network service provider to verify prior authentication of the communication device for use of the second wireless access point by the communication device.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing authentication resumption across different service providers' networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
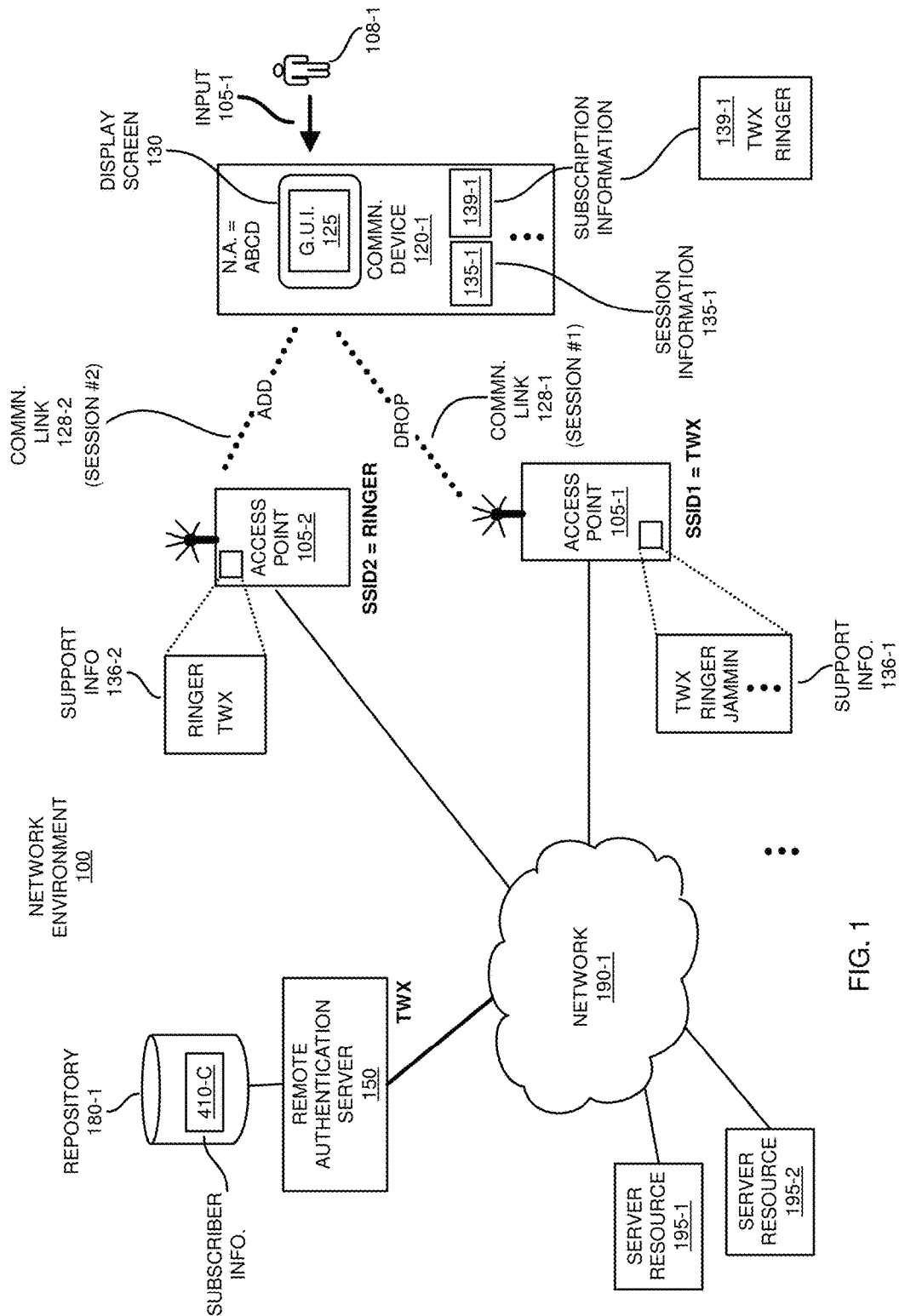
FIG. 1 is an example diagram illustrating a network environment supporting follow-on authentication according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a user-operated communication device stores security association information (such as acquired during prior EAP authentication) that is initially used to wirelessly connect the user-operated communication device to a first wireless access point made available by a first private wireless network service provider. Assume that the user-operated communication device roams out of a first wireless coverage region supported by the first wireless access point into wireless range of a second wireless access point operated by a second private wireless network service provider. Assume further that the second private wireless network service provider has an agreement with the first private wireless network service provider to allow the first service provider's subscribers use of the second private wireless network service provider's wireless access points. In such an instance, instead of requiring the communication device to perform full authentication with the second service provider to establish a wireless communication link with the second wireless access point, embodiments herein include utilizing the previously stored security association information (associated with and provided by the first service provider) to wirelessly connect the communication device to the second wireless access point. Accordingly, in contrast to conventional methods, embodiments herein support authentication resumption (i.e., a reduced version of subsequent authentication) across different service providers' wireless networks, resulting in quicker handoffs between the different service providers' networks.

Now, more specifically, FIG. 1 is an example diagram illustrating a network environment according to embodiments herein.

Note that each of the resources such as the remote authentication server 150, wireless access point 105-1, wireless access point 105-2, server resource 195-1, server resource 195-2, communication device 120-1, network 190-1, etc., represents and/or includes appropriate hardware, software, or a combination of hardware and software to carry out functionality as discussed herein.

In this example embodiment, the wireless access point 105-1 is assigned SSID1=TWX. This SSID name indicates that the wireless access point 105-1 is made available and/or owned by the TWX Corporation. Users and communication devices in network environment 100 utilize the network SSID name to determine whether to connect to such a wireless network.

In accordance with agreements with one or more other service providers (such as RINGER, JAMMIN, etc.), as indicated by support information 136-1 assigned to wireless access point 105-1, the wireless access point 105-1 supports connectivity associated with service providers TWX, RINGER, JAMMIN, etc. In such an instance, any subscribers of these service providers are able to use the wireless access point 105-1.

Further in this example embodiment, the wireless access point 105-2 is assigned SSID2=RINGER. This SSID name indicates that the wireless access point 105-2 is made available and/or owned by the RINGER Corporation. In accordance with agreements with one or more other service providers (such as TWX), as indicated by support information 136-2, the wireless access point 105-2 supports connectivity associated with service provider RINGER as well as supports wireless capability associated with service provider TWX. The association (i.e., assignment of TWX to the wireless access point 105-2) as specified by the support information 136-2 indicates that a TWX subscriber is able to use the wireless access point 105-2 to access network 190-1.

Note that subscription information 139-1 associated with the communication device 120-1 indicates that the user 108-1 is able to use any TWX wireless access points and, based on cross agreements with RINGER, any of the RINGER-provided wireless access points as well.

As shown, network environment 100 includes communication device 120-1. The communication device 120-1 can be any suitable type of device such as a cell phone, tablet, computer device, IPAD™, personal computer, etc.

Further in this example embodiment, assume that the user 108-1 initially operates communication device 120-1 to establish the communication link 128-1 between the communication device 120-1 and the wireless access point 105-1 operated by a first service provider TWX. The communication device 120-1 learns of the presence of the wireless access point 105-1 via the wireless access point 105-1 transmitting SSID1=TWX in the network environment.

As indicated by subscription information 139-1, the user 108-1 is a subscriber to the wireless network services provided by service provider TWX as well as RINGER. Accordingly, the communication device 120-1 is able to establish a wireless communication link 128-1 with wireless access point 105-1 after authentication with remote authentication server 150 as discussed below.

To establish the communication link 128-1, the communication device 120-1 communicates with wireless access point 105-1. Prior to allowing establishment of the communication link 128-1, the wireless access point 105-1 first initiates authentication of the communication device 120-1 and/or corresponding user 108-1.

In one example embodiment, authentication includes communicating with the remote authentication server 150. During authentication, assuming that the communication device 120-1 provides the appropriate credentials (such as username, password, etc.) to establish the wireless communication link 128-1, through the wireless access point 105-1, the remote authentication server 150 provides the communication device 120-1 with session information 135-1 (associated with and provided by service provider TWX) supporting communications over the wireless communication link 120-1.

Note that the communication device 120-1, if desired, can be configured to store session information associated with each of multiple different service providers in a similar manner that communication device stores session information 135-1 associated with service provider TWX. Such information can be used to support authentication resumption to any of multiple different service providers.

Figure 4:
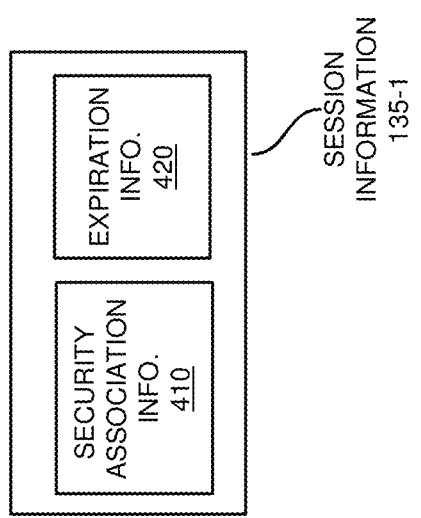
FIG. 4 is an example diagram illustrating session information according to embodiments herein.

In one embodiment, as further shown in FIG. 4, the session information 135-1 includes any suitable information such as security association information 410. The security association information 410 can include information such as one or more encryption/decryption keys that are to be used by the communication device 120-1 during session #1 of communicating over secured wireless communication link 120-1.

Additionally, note that the session information 135-1 can be configured to include expiration information 420 indicating a time duration in which the respective security association information 410 is valid.

As further shown, the communication device 120-1 stores session information 135-1 (including security association information 410 as well as expiration information 420) used to wirelessly connect the user-operated communication device 120-1 to first wireless access point 105-1 operated by first private wireless network service provider TWX. As previously discussed, the user 108-1 of the communication device 120-1 is a subscriber of wireless network services provided by the first private wireless network service provider TWX.

In one embodiment, the communication device 120-1 receives and stores the session information 135-1 during or around a time of performing authentication in accordance with EAP.

As further discussed below, during session #1, via the wireless access point 105-1, the communication device 120-1 communicates over the network 190-1 to one or more server resources 195 such as server resource 195-1, server resource 195-2, etc. Communications can include transmitting and receiving data.

In one embodiment, network 190 includes a packet-switched network facilitating distribution of communications (such as one or more data packets) in accordance with any suitable communication protocol. As a specific example embodiment, network 190 and corresponding resources therein support client/server communications and switching of data packets using source and destination address information. For example, the source address of a communication such as a data packet indicates a corresponding resource from which the data packet is generated. A destination address of a communication (data packet) indicates a corresponding address of the resource to which the data packet is being transmitted. The resources in network 190 uses the destination address to route the respective data packets to an identified destination. The recipient (destination) of the communication uses the source address (associated with a respective communication device) to identify a particular client that transmitted the communication.

In accordance with other embodiments, the communication device 120-1 in network environment 100 is equipped to communicate in a wireless manner with an available access point. In one non-limiting example embodiment, each of one or more wireless access points 105 (such as access point 105-1, access point 105-2, etc.) and corresponding mobile communication devices 120 in network environment 100 supports communications over a respective wireless communication links 128 via any suitable protocol. By way of non-limiting example embodiment, a mobile communication device and a respective wireless access point can communicate (over communication links 128) in accordance with WiFi™ standards such as IEEE (Institute of Electrical and Electronics Engineers) 802.11a, 802.11b, 802.11g, 802.11n, etc.

Figure 2:
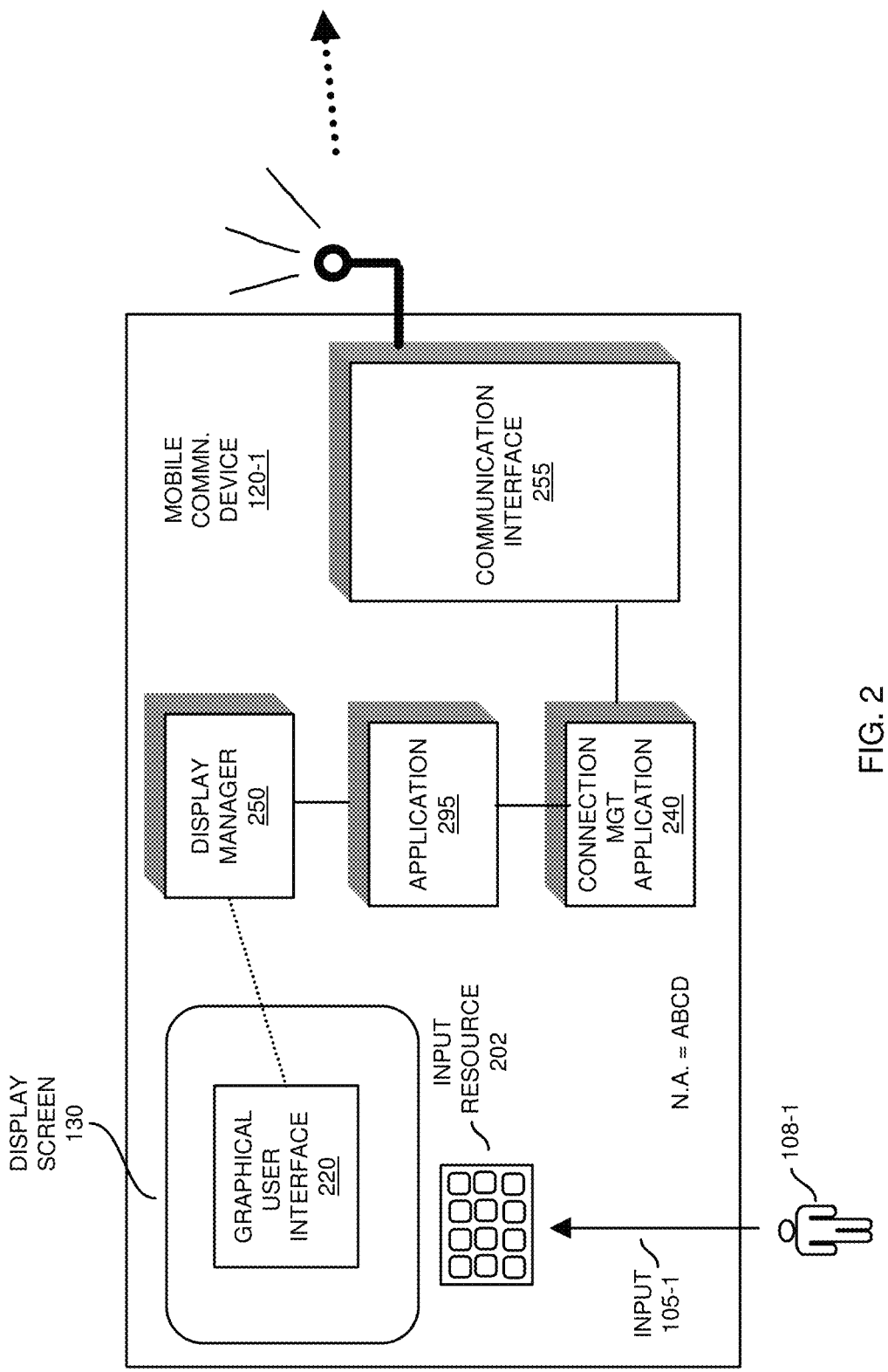
FIG. 2 is an example diagram illustrating a mobile communication device according to embodiments herein.

FIG. 2 is an example block diagram illustrating functionality associated with a respective mobile communication device according to embodiments herein. Note that each of the mobile communication devices 120 can include any suitable hardware and software resources to carry out operations as discussed herein.

As previously discussed, each of the mobile communication devices 120 in network environment 100 can be any suitable type of computer device. For example, a respective mobile communication device can be a cell phone, mobile computer, mobile phone device, digital assistant, a laptop computer, a personal computer, a notebook computer, a netbook computer, a handheld computer, a workstation, etc.

As further shown in this example embodiment, mobile communication device 120-1 includes display screen 130, connection management application 240, display manager 250, application 295 (such as a browser application), communication interface 255, etc. Each mobile communication devices in network environment 100 can operate in a similar manner and include similar resources, interfaces, applications, etc., as mobile communication device 120-1 as shown in FIG. 2.

Via input 105-1 to input resource 202 (such as a keyboard, touchscreen, mouse, etc.), assume that the user 108-1 initiates execution of application 295 such as a browser application. In one embodiment, subsequent to execution, the application 295 communicates with connection management application 240 to establish a respective wireless connection with a corresponding access point in network environment 100.

In response to receiving a command from application 295 to establish a network connection, the connection management application 240 (via communication interface 255) attempts to establish a respective wireless communication link with an available wireless access point in network environment 100.

In this example embodiment, assume that the mobile communication device 120-1 attempts to establish respective wireless communication link 128-1 with access point 105-1. As previously discussed, this can include generating and transmitting a corresponding discovery request (such as from communication interface 255) to any listening access points 105 in network environment 100. The connection management application 240 selects amongst the responding one or more access points to establish a corresponding wireless communication link 120-1.

In one embodiment, whether to allow establishment of a respective wireless communication link may depend on authentication and authorization of the respective mobile communication device by remote server 150.

As previously discussed, subsequent to authentication and establishing a respective wireless communication link, the application 295 is able to communicate through a respective access point and access network 190. As further shown in this example embodiment, via display manager 250 in mobile communication device 120-1, the application 295 initiates display of corresponding graphical user interface 220 (such as a browser interface) on display screen 130 of mobile communication device 120-1. Graphical user interface 220 on display screen 130 enables the respective user 108-1 to view information retrieved from any of one or more server resources in network environment 100.

Figure 3:
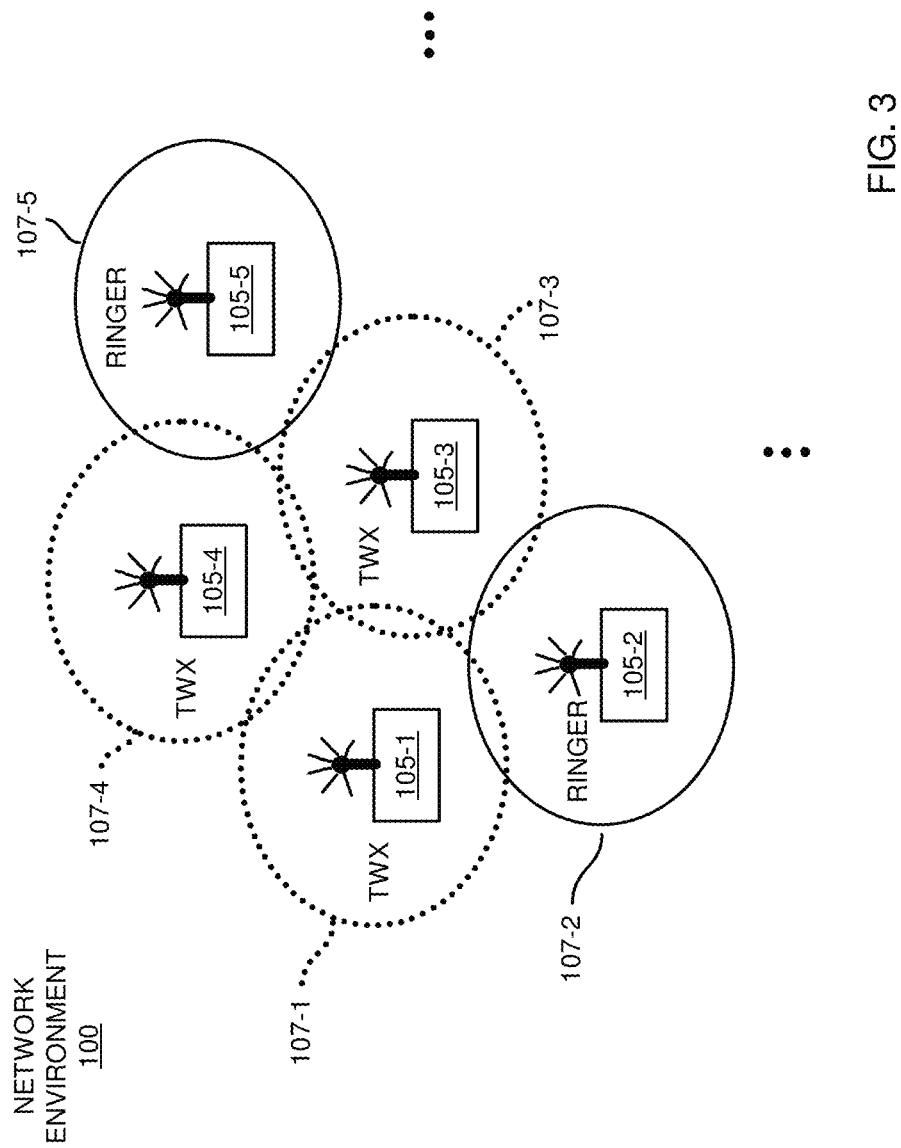
FIG. 3 is an example diagram illustrating wireless coverage regions supported by different service providers according to embodiments herein.

FIG. 3 is an example diagram illustrating overlapping presence of multiple wireless access points in a network environment according to embodiments herein.

As shown, a first set of multiple wireless access points including wireless access point 105-1, wireless access point 105-3, wireless access point 105-4, etc., are associated with first service provider (namely, TWX corp.). The first service provider (TWX) owns, operates, pays fees for use of, rents, etc., the first set of wireless access points to provide wireless connectivity to corresponding subscribers in network environment 100.

In one embodiment, wireless access point 105-1 provides wireless network connectivity to users in region of wireless coverage 107-1; wireless access point 105-3 provides wireless network connectivity to users in a region of wireless coverage 107-3; wireless access point 105-4 is wireless network connectivity to users in a region of wireless coverage 107-4; and so on.

As further shown, a second set of multiple wireless access points including wireless access point 105-2, wireless access point 105-5, etc., are associated with second service provider (namely, RINGER corp.). The second service provider (RINGER) owns, operates, rents, etc., the second set of wireless access points to provide wireless connectivity to corresponding subscribers in network environment 100.

In one embodiment, wireless access point 105-2 provides wireless network connectivity to users in region of wireless coverage 107-2; wireless access point 105-5 provides wireless network connectivity to users in region of wireless coverage 107-5; and so on.

Further in this example embodiment, to provide a larger region of wireless coverage, assume that the first service provider and the second service provider agree to provide respective subscribers access to each other's wireless networks. For example, assume that the user 108-1 is a subscriber to the first service provider. Because the user 108-1 is a subscriber, the first service provider provides wireless capability to subscriber user 108-1 via any of wireless access points 105-1, 105-3, 105-4, etc.

Because of the agreement between the first service provider and the second service provider, the second service provider also provides the user 108-1 use of its wireless network including wireless access point 105-2, wireless access point 105-5, etc., to access a remote network such as the Internet.

The agreement therefore provides expanded wireless coverage to the TWX subscriber.

Accordingly, the user 108-1 is able to operate the communication device 120-1 in a larger region of coverage. In other words, providing the user 108-1 the ability to also access a remote network such as the Internet via wireless access points 105-2, 105-4, etc., enables the communication device 120-1 to establish a wireless connection in any of the regions of wireless coverage 107-1, 107-2, 107-3, 107-4, 107-5, etc., as opposed to being limited to using only regions of wireless coverage 107-1, 107-3, 107-4, etc., supported by the first service provider TWX.

Referring again to FIG. 1, note that the session information 135-1 can be used to support handoffs from one TWX-operated wireless access point to another TWX-operated wireless access point.

Additionally, in contrast to conventional techniques, the session information 135-1 can be used to perform a faster handoff (using authentication resumption) between a TWX-operated wireless access point 105-1 to a RINGER-operated wireless access point 105-2 as further discussed below.

As an example, assume that after authentication and use of wireless communication link 128-1 to access network 191-1, the communication device 120-1 roams outside of the region of wireless coverage 107-1 (FIG. 3) into region of wireless coverage 107-2 (FIG. 3). In such an instance, to maintain wireless connectivity with a respective remote network 190-1, the communication device 120-1 listens for beacons generated by nearby wireless access points. In this example embodiment, the wireless access point 105-2 transmits one or more wireless communications (such as beacons) indicating presence of a second wireless access point 105-2 in the network environment 100.

In one embodiment, in addition to notifying the communication device 120-1 of its availability and presence, the wireless communications from the wireless access point 105-2 indicate that the wireless access point 105-2 is Passpoint supported. This provides the communication device 120-1 provides an indication that the wireless access point 105-2 supports wireless connectivity to subscribers of multiple different service providers.

The communication device 120-1 receives the (broadcasted) communications from the second wireless access point. As previously discussed, the second wireless access point 105-2 is operated by a second private wireless network service provider RINGER. The broadcast message or beacon indicates an identity (such as SSID2=RINGER) and availability of the second wireless access point 105-2 in the region of wireless coverage 107-2.

In one embodiment, to learn of the different service providers supported by the wireless access point 105-2, the communication device 120-1 generates and transmits a query to the second wireless access point 105-2. In one embodiment, the query includes a request of identities of different private wireless network service providers supported by the second wireless access point 105-2.

The wireless access point 105-2 receives the query (request) from the communication device 120-1 requesting identities of multiple different private wireless network service providers supported by the second wireless access point 105-2. In response to receiving the request, as specified by the support information 136-2, the wireless access point 105-2 notifies the communication device 120-1 (client device), via a response, that the second wireless access point 105-2 provides connectivity for subscribers of the first private wireless network service provider TWX and subscribers of the second private wireless network service provider RINGER.

The communication device 120-1 receives the response (list of different supported service providers) to the query. The response from the wireless access point 105-2 indicates that the different private wireless network service providers supported by the second wireless access point 105-2 includes service provider TWX and service provider RINGER in this example.

Based on the communications received from the wireless access point 105-2 such as the response to the query, the communication device 120-1 identifies that the second wireless access point 105-2 is operated by the second private wireless network service provider RINGER and that the second private wireless network service provider RINGER provides wireless access to subscribers of the first private wireless network service provider TWX. Thus, although the wireless access point 105-2 is not a TWX-operated wireless access point, the service provider TWX has an agreement with the service provider RINGER to provide TWX subscribers access to network 190-1 through the wireless access point 105-2.

In response to learning that the communication device 120-1 is able to use the wireless access point 105-1 as indicated by received pass point information (i.e., query response including a list of the different service providers supported by the wireless access point 105-2), and that the expiration information 420 indicates that the security association information 410 is still valid for use, the communication device 120-1 generates a request to the wireless access point 105-2 to establish a wireless communication link 128-2 with the second wireless access point 105-2. The communication device 120-1 transmits the request to the wireless access point 105-2.

In one embodiment, because the communication device 120-1 detects that the wireless access point 105-2 supports wireless network service by a TWX, and because the communication device 120-1 was previously authenticated to use the TWX wireless network services, the communication device 120-1 initiates authentication resumption based upon the prior authentication. This can include, as further discussed below, communicating the request for authentication resumption to the wireless access point 105-2, notifying the wireless access point 105-2 that it is a TWX subscriber attempting to use services on behalf of service provider TWX.

In one embodiment, the request generated by the communication device 120-1 indicates (such as via any suitable information indicating it is a TWX subscriber) that the communication device 120-1 would like to perform authentication resumption with respect to the service provider TWX and use wireless network services provided by TWX through the partner-supported (RINGER-supported) wireless access point 105-2.

Accordingly, the wireless access point 105-2 receives the request from the communication device 120-1 to establish the wireless connection with the second wireless access point 105-2.

Because authentication resumption as described herein relies upon previously performed authentication, the process of authenticating the communication device 120-1 using authentication resumption for use of wireless access point 105-2 is much quicker than a full-up authentication that is required according to conventional techniques. For example, full up authentication (such as erasing of old encryption/ decryption keys and providing new keys) may require more than 400 milliseconds to complete. One embodiment of authentication resumption (reusing previous keys) as described herein can be performed in less than 60 milliseconds, enabling much quicker handoffs of communication devices between different wireless network service providers.

In response to receiving the request to establish the new wireless communication link 128-2 to support session #2 (such as a handoff from the first wireless access point 105-one to the second wireless access point 105-2), and because the communication device 120-1 requests to use services provided by TWX, the wireless access point 105-2 generates and forwards on authentication resumption request message on behalf of the communication device 120-1 to remote authentication server 150 operated by the first private wireless network service provider TWX.

As previously discussed, even though the wireless access point 105-2 is operated (provided) by RINGER corp., based on the agreement between RINGER corp. and TWX corp., the wireless access point 105-2 provides wireless network services to the user 108-1 since the user 108-1 is a subscriber to TWX wireless network services.

In one embodiment, the message (such as one or more communications) forwarded from the wireless access point 105-2 to the remote authentication server 150 includes an identity of the communication device 120-1 (such as its assigned network address ABCD). The message indicates that the communication device 120-1 requests to establish a connection with the second wireless access point 105-2 using authentication resumption as described herein.

Prior to granting the communication device 120-1 use of wireless access point 105-2, the remote authentication server 150 first verifies (via an abridged authentication check or authentication resumption) whether or not the communication device 120-1 should be afforded use of the wireless access point 105-2.

Recall that the remote authentication server 150 previously authenticated the communication device 120-1 to use wireless access point 105-1 for session #1. Accordingly, the remote authentication server 150 is aware of the session information 135-1 stored in cache of the communication device 120-1.

To verify whether the communication device 120-1 should be allowed use of the wireless access point 105-2, the remote authentication server 150 transmits a challenge to the wireless access point 105-2. The challenge is directed to the communication device 120-1. In such an instance, the wireless access point 105-2 forwards the challenge generated by the remote authentication server 150 to the communication device 120-1.

In response to receiving the challenge, the communication device 120-1 accesses the stored security association information 410 (in session information 135-1) previously used to wirelessly connect the user-operated communication device 120-1 to the first wireless access point 105-1.

In one embodiment, in response to receiving the challenge, the communication device 120-1 retrieves security association information 410 (such as a unique bit string or previously generated random number based session ID value assigned to the communication device 120-1). The communication device 120-1 generates a session identifier value based on the security association information 410 in any suitable manner. For example, the communication device 120-1 can be configured to derive the session identifier value from the security association information 410; the communication device 120-1 can be configured to retrieve the session identifier value from the security association information 410; and so on.

The communication device 120-1 forwards the session ID value (in the challenge response) to the wireless access point 105-2. The wireless access point 105-2 forwards the session identifier value (challenge response) generated by the communication device 120-1 to the remote authentication server 150 operated by the first private wireless network service provider TWX.

The remote authentication server 150 receives the challenge response (generated session identifier value) originating from the communication device 120-1. In one embodiment, as previously discussed, the communication device 120-1 provides the session ID that is the identity for the prior session and corresponding security association information 410 410 previously used by the communication device to establish a wireless connection with the first wireless access point 105-1 associated with the first private wireless network service provider TWX.

The remote authentication server 150 keeps track of a copy of the security association information 410 stored in the communication device 120-1.

Upon receiving the session ID generated by the communication device 120-1, the remote authentication server 150 verifies that the communication device 120-1 provides the appropriate session identifier value. In this example, assume that the remote authentication server 150 verifies the received session identifier value indicating that the communication device 120-1 is therefore authorized to use the wireless network services provided by wireless access point 105-2 (provided and operated by RINGER corp.).

Subsequent to the remote authentication server 150 operated by the first private wireless network service provider validating the challenge response, the remote authentication server 150 transmits a communication to the wireless access point 105-2 that the communication device 120-1 operated by user 108-1 should be allowed use of the wireless access point 105-2.

In response to the wireless access point 105-to receiving the notification from the remote authentication server 150 to provide the communication device 120-1 wireless connectivity through the second wireless access point 105-2, the wireless access point 105-2 commences with establishing an appropriate wireless communication link 128-2 to support communications between the communication device 120-1 through the wireless access point 105-2 to the network 190-1 and server resources 195.

In one embodiment, subsequent to creating the wireless communication link 128-2 to support session #2, the communication device 120-1 initiates dropping of the wireless communication link 128-1. Accordingly, embodiments herein include providing authentication resumption across different private wireless networks.

Figure 5:
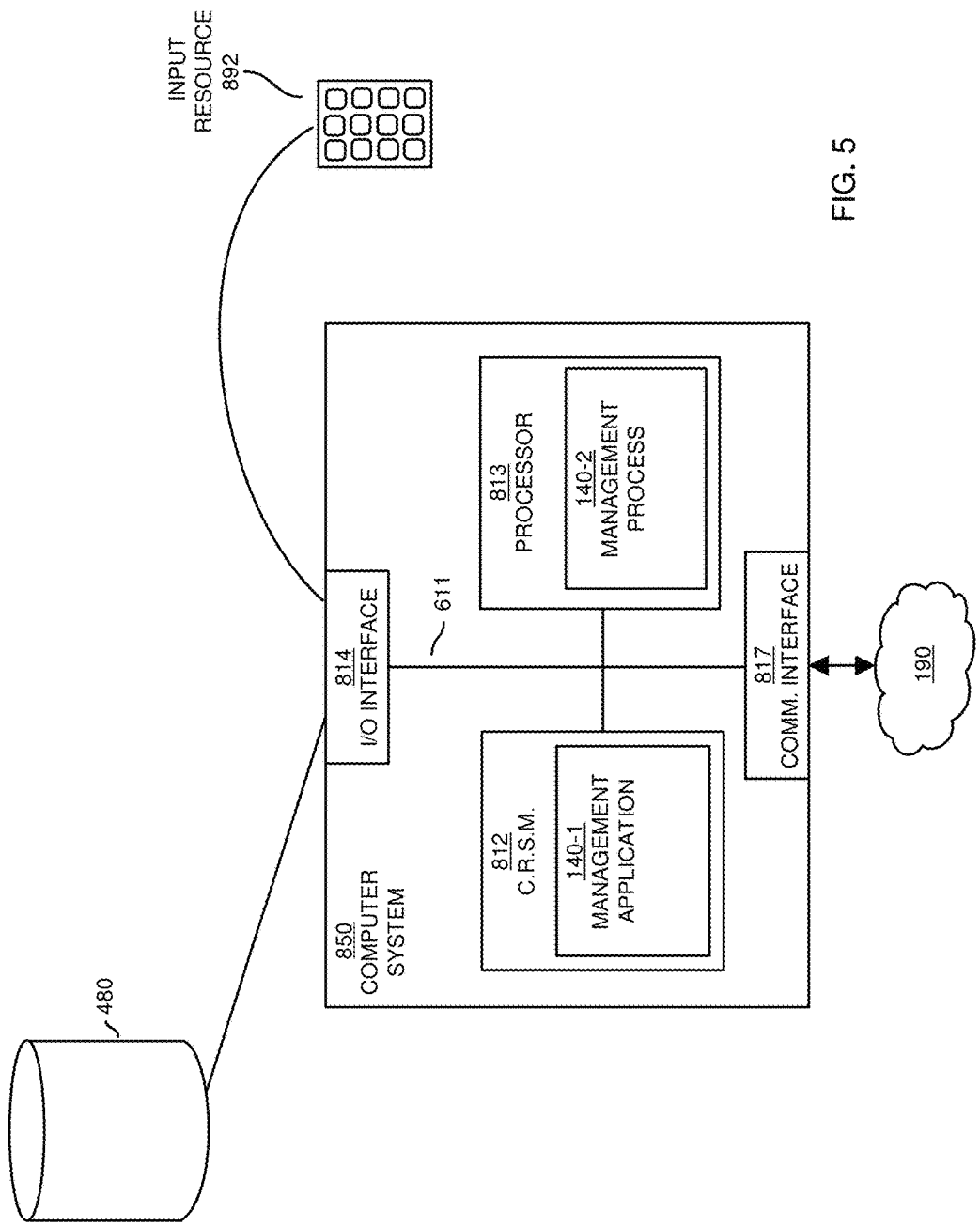
FIG. 5 is an example diagram illustrating a computer system to carry out operations according to embodiments herein.

FIG. 5 is a diagram illustrating an example computer architecture in which to execute any of the functionality according to embodiments herein. Any of the different processing techniques can be implemented via execution of software code on computer processor hardware. Computer system 850 may reside in the communication device 120-1; computer system 850 may reside in a respective wireless access point; computer system may reside in the remote authentication server 150; and so on.

As shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Note again that the computer system 850 can be located at any suitable locations in network environment 100 to carry out the operations as discussed herein. For example, computer processor hardware (i.e., processor 813 and/or computer system 850) and/or management application 140-1 can be located in a single location or can be distributed amongst multiple locations. Management application 140-1 can be configured to execute the operations as discussed with respect to remote authentication server 150, communication device 120-1, wireless access point 105-1, wireless access point 105-2, etc.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with management application 140-1.

Communications interface 817 enables the computer system 850 and processor resource 813 to communicate over a resource such as any of networks 890. I/O interface 814 enables processor resource 813 to access data from a local or remote location, control a respective display screen, receive input, etc.

As shown, computer readable storage media 812 can be encoded with management application 140-1 (e.g., software, firmware, etc.) executed by processor 813. Management application 140-1 can be configured to include instructions to implement any of the operations as discussed herein associated with the communication device 120-1, wireless access point 15-1, wireless access point 105-2, remote authentication server 150, etc.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor resource 813. In other words, the management process 140-2 associated with processor resource 813 represents one or more aspects of executing management application 140-1 within or upon the processor resource 813 in the computer system 850.

Those skilled in the art will understand that the computer system 850 can include other processes and/or software and hardware components, such as an operating system that controls allocation and use of hardware resources to execute management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement any of the functionality as discussed herein.

Note that each of the other functions as discussed herein can be executed in a respective computer system based on execution of corresponding instructions. For example, communication device can include respective computer readable storage medium and processor hardware to execute the operations performed by communication device 110-1.

Functionality supported by the different resources will now be discussed via flowcharts in FIGS. 6-11. Note that the steps in the flowcharts below can be executed in any suitable order.

Figure 6:
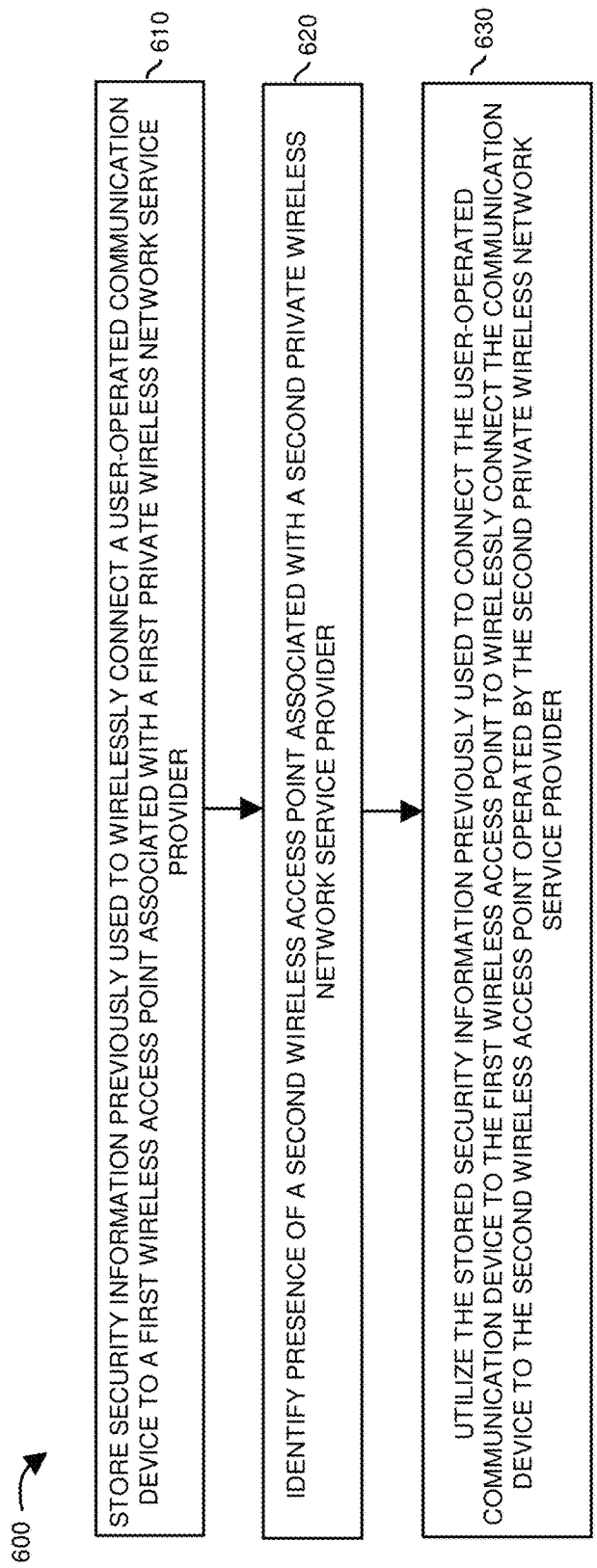
FIGS. 6-11 are example diagrams illustrating methods according to embodiments herein.

FIG. 6 is a flowchart 600 illustrating an example method according to embodiments herein. Note that there will be some overlap with respect to concepts as discussed above.

In processing block 610, the communication device 120-1 (or other suitable resource) initiates storage of security association information 410 previously used to wirelessly connect the user-operated communication device 120-1 to a first wireless access point 105-1 associated with and generated by a first private wireless network service provider (TWX).

In processing block 620, the communication device 120-1 identifies presence and availability of a second wireless access point 105-1 associated with a second private wireless network service provider (RINGER).

In processing block 630, the communication device 120-1 utilizes the stored security association information 410 previously used to connect the user-operated communication device 120-1 to the first wireless access point 105-1 to wirelessly connect the communication device 120-1 to the second wireless access point 105-2 operated by the second private wireless network service provider.

Figure 7:
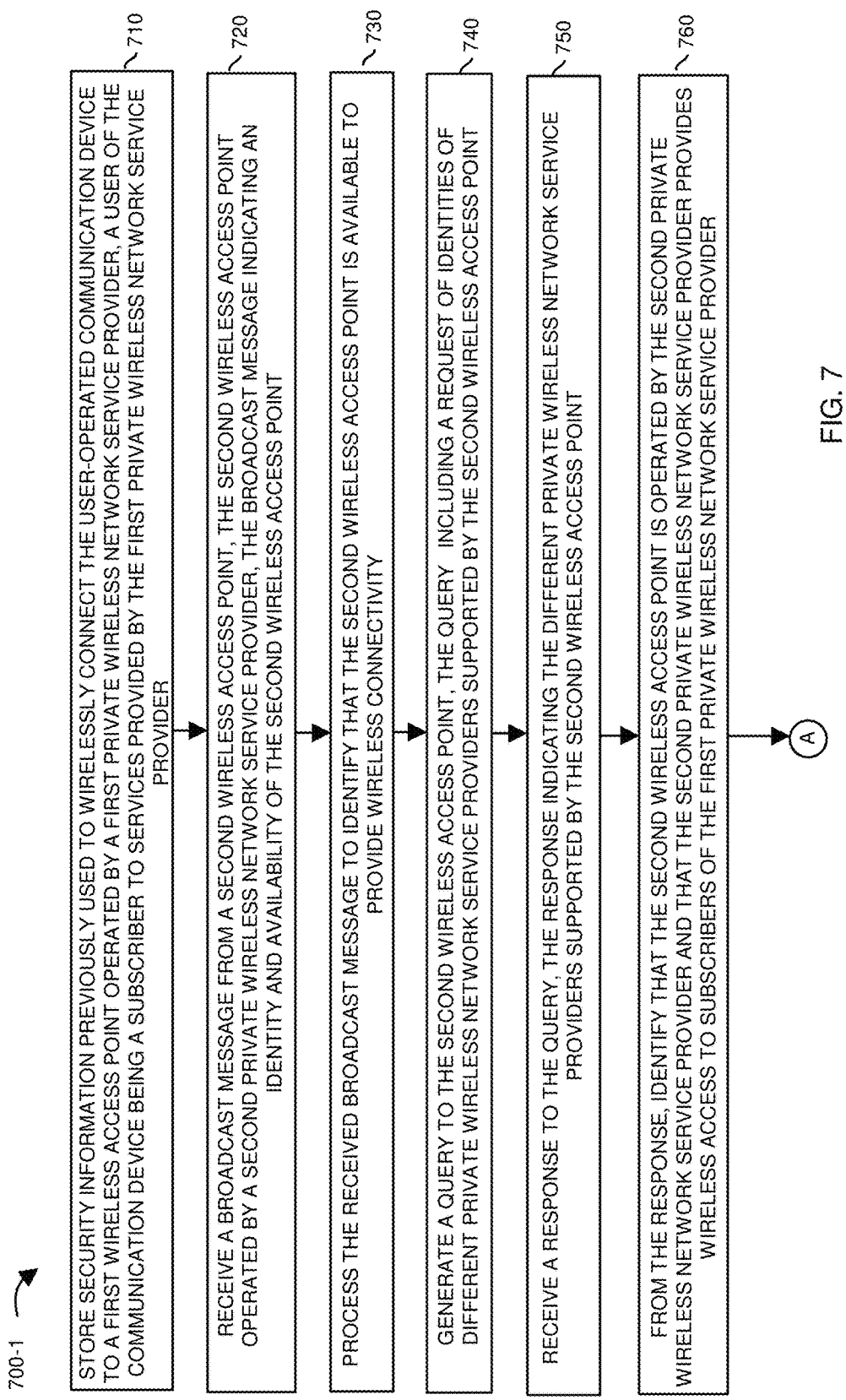

FIG. 7 is a flowchart 700-1 illustrating an example method according to embodiments herein. Note that there will be some overlap with respect to concepts as discussed above.

In processing block 710, the communication device 120-1 (or other suitable resource) stores security association information 410 previously used to wirelessly connect the user-operated communication device 120-1 to a first wireless access point 105-1 operated by a first private wireless network service provider TWX. The user 108-1 of the communication device 120-1 is a subscriber of services provided by a first private wireless network service provider (TWX).

In processing block 720, the communication device 120-1 receives a broadcast message from the second wireless access point 105-2. The second wireless access point 105-2 is associated with and operated by a second private wireless network service provider. The broadcast message indicates an identity and availability of the second wireless access point 105-2.

In processing block 730, the communication device 120-1 processes the received broadcast message to identify that the second wireless access point 105-2 is available to provide wireless connectivity in network environment 100. The broadcast message can indicate that the wireless access point 105-2 supports pass point.

In processing block 740, the communication device 120-1 generates a query to the second wireless access point 105-2. The query includes a request for a list of identities of the different private wireless network service providers supported by the second wireless access point 105-2.

In processing block 750, the communication device 120-1 receives a response to the query. The response to the query indicates the different private wireless network service providers supported by the second wireless access point 105-2. In this example embodiment, the second wireless access point 105-2 supports subscribers associated with service provider RINGER and service provider TWX.

In processing block 760, the communication device 120-1 processes the response (and listing of service providers including RINGER and TWX) to identify that the second wireless access point 105-2 is operated by the second private wireless network service provider and that the second private wireless network service provider RINGER (and wealth access point 105-2) provides wireless access to subscribers of the first private wireless network service provider TWC.

Figure 8:
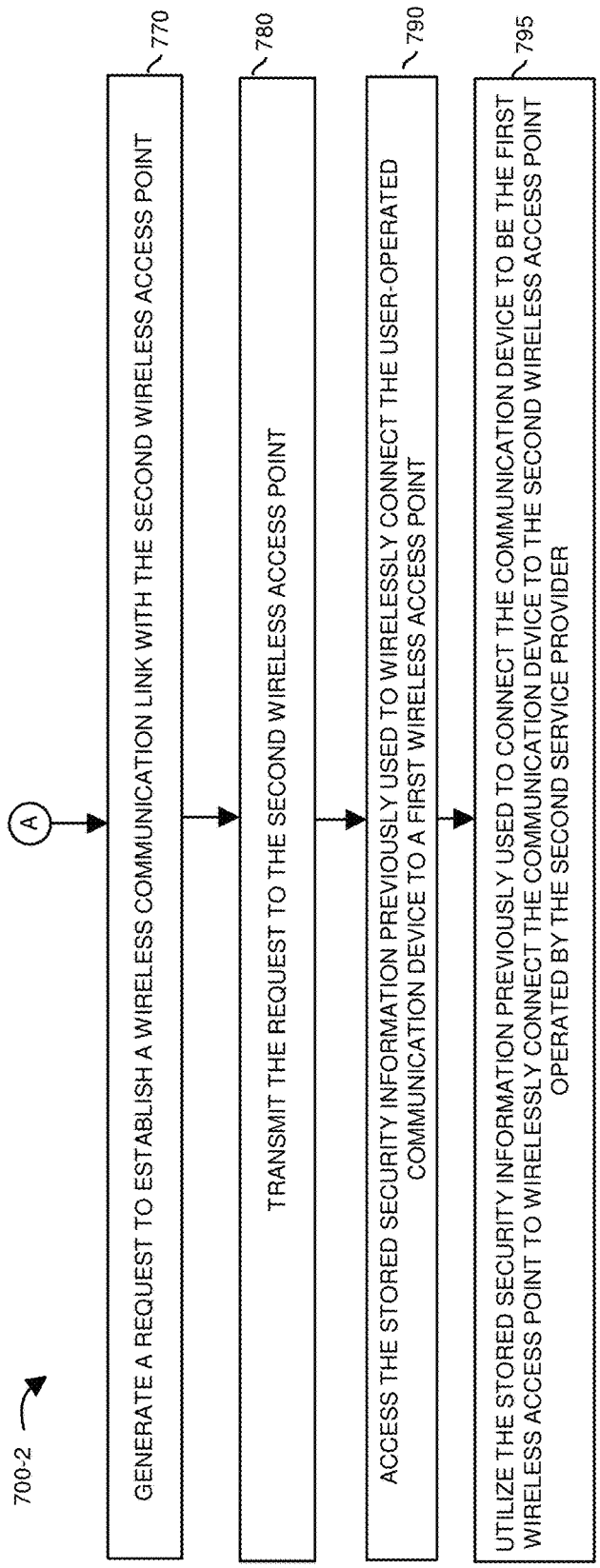

Referring now to flowchart 700-2 in FIG. 8, in processing block 770, the communication device generates a request to establish a wireless communication link 128-2 with the second wireless access point 105-2.

In processing operation 780, the communication device 120-1 transmits the link request to the second wireless access point 105-2.

In processing operation 790, the communication device 120-1 accesses the stored security association information 410 previously used to wirelessly connect the user-operated communication device to the first wireless access point 105-1.

In processing operation 795, the communication device 120-1 utilizes the stored security association information 410 previously used to connect the communication device 120-1 to the first wireless access point 105-1 to wirelessly connect the communication device 120-1 to the second wireless access point 105-2 operated by the second service provider RINGER.

Figure 9:
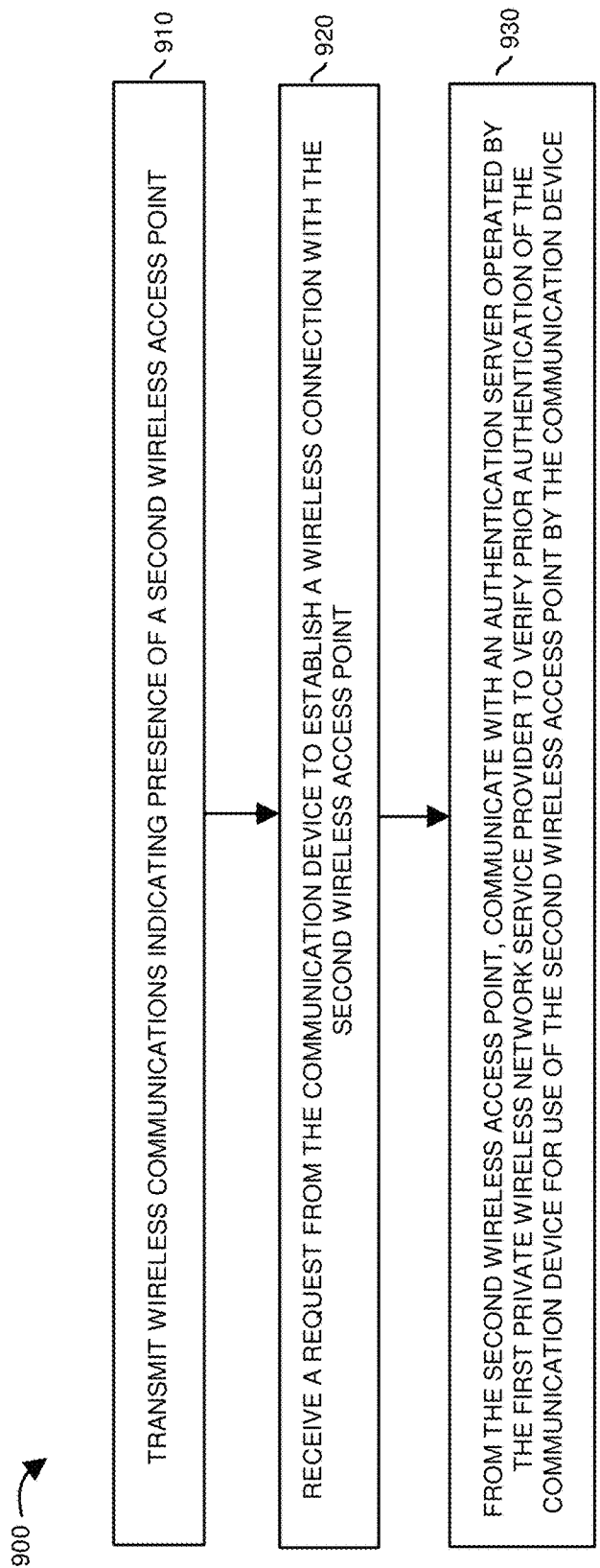

FIG. 9 is a flowchart 900 illustrating an example method according to embodiments herein. Note that there will be some overlap with respect to concepts as discussed above.

In processing block 910, the wireless access point 105-2 transmits wireless communications indicating presence and availability of the second wireless access point 105-2 in network environment 100.

In processing block 920, the wireless access point 105-2 receives a request from the communication device 120-1 to establish a wireless connection with the second wireless access point 105-2.

In processing block 930, the wireless access point 105-2 communicates with remote authentication server 150 operated by the first private wireless network service provider (TWX) to verify prior authentication of the communication device 120-1 for use of the second wireless access point 120-1 and respective wireless service by the communication device 120-1.

Figure 10:
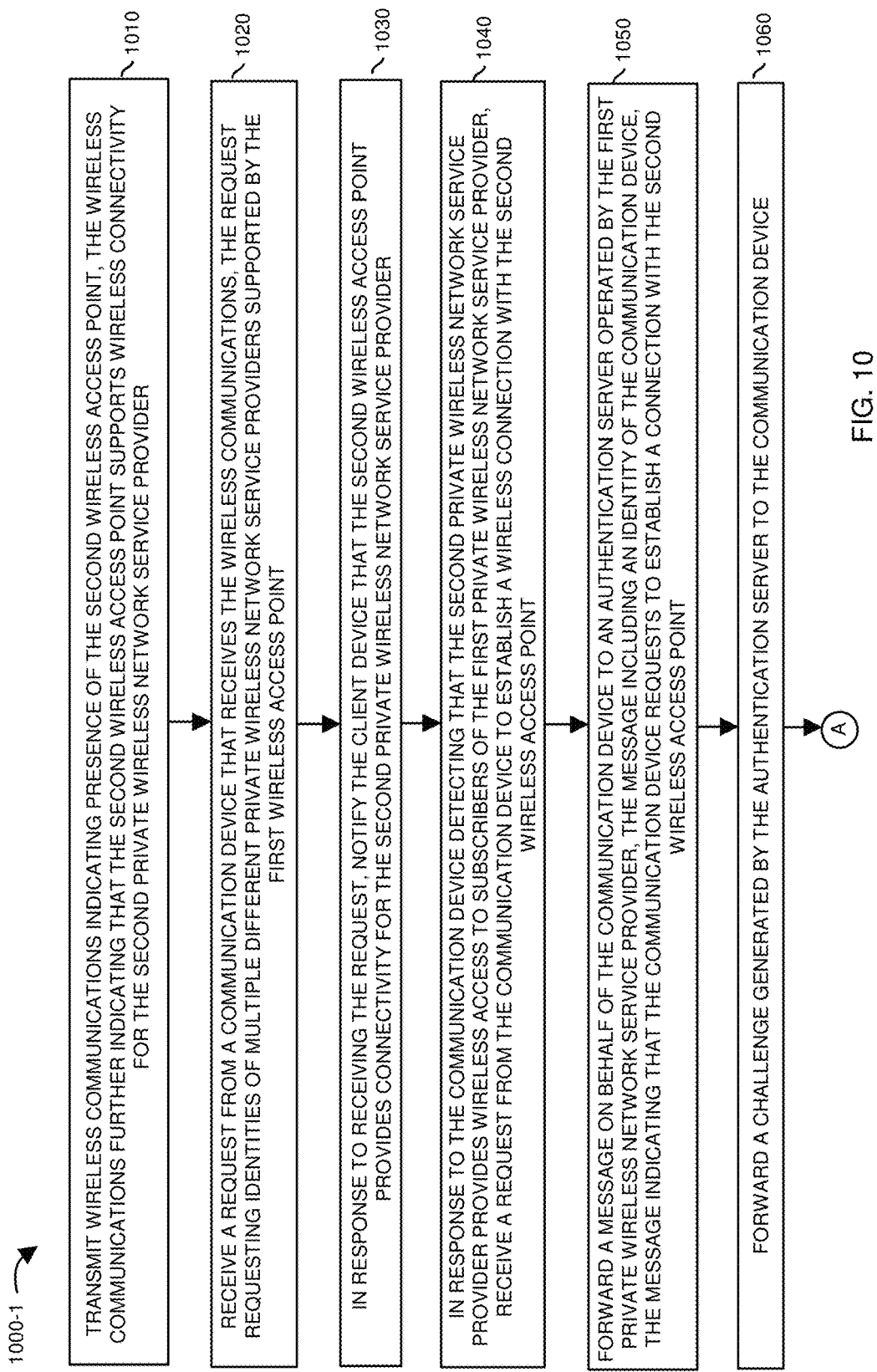

FIG. 10 is a flowchart 1000 illustrating an example method according to embodiments herein. Note that there will be some overlap with respect to concepts as discussed above.

In processing operation 1010, the wireless access point 105-2 transmits wireless communications indicating presence and availability of the wireless access point 105-2 in the network environment 100. In one embodiment, the wireless communications further indicate that the second wireless access point 105-2 supports wireless connectivity for the second private wireless network service provider RINGER as well as the first private wireless network service provider TWX.

In processing operation 1020, the wireless access point 105-2 receives a request from a communication device 120-1 that receives the wireless communications. The request requests identities of multiple different private wireless network service providers supported by the second wireless access point 105-2.

In processing operation 1030, in response to receiving the request, the wireless access point 105-2 notifies the communication device 120-1 (client device) that the second wireless access point 105-2 provides connectivity for the second private wireless network service provider RINGER as well as the first wireless network service provider TWX.

In processing operation 1040, in response to the communication device 120-1 detecting that the second private wireless network service provider (and corresponding wireless access point 105-2) provides wireless access to subscribers of the first private wireless network service provider TWX (to which the user 108-1 is a subscriber), the wireless access point 105-2 receives a request from the communication device 120-1 to establish wireless communication link 128-2.

In processing operation 1050, the wireless access point 105-2 forwards a message on behalf of the communication device 120-1 to a remote authentication server 150 operated by the first private wireless network service provider TWX. In one embodiment, the message includes an identity (such as network address ABCD) of the communication device 120-1. The message indicates that that the communication device 120-1 requests to establish a connection with the second wireless access point 105-2. In one embodiment, the message indicates that the communication device 120-1 desires to perform authentication resumption to connect with the wireless access point 105-2.

In processing operation 1060, the wireless access point 105-2 receives a challenge from the remote authentication server 150. The wireless access point 105-2 forwards the challenge generated by the remote authentication server 150 to the communication device 120-1.

Figure 11:
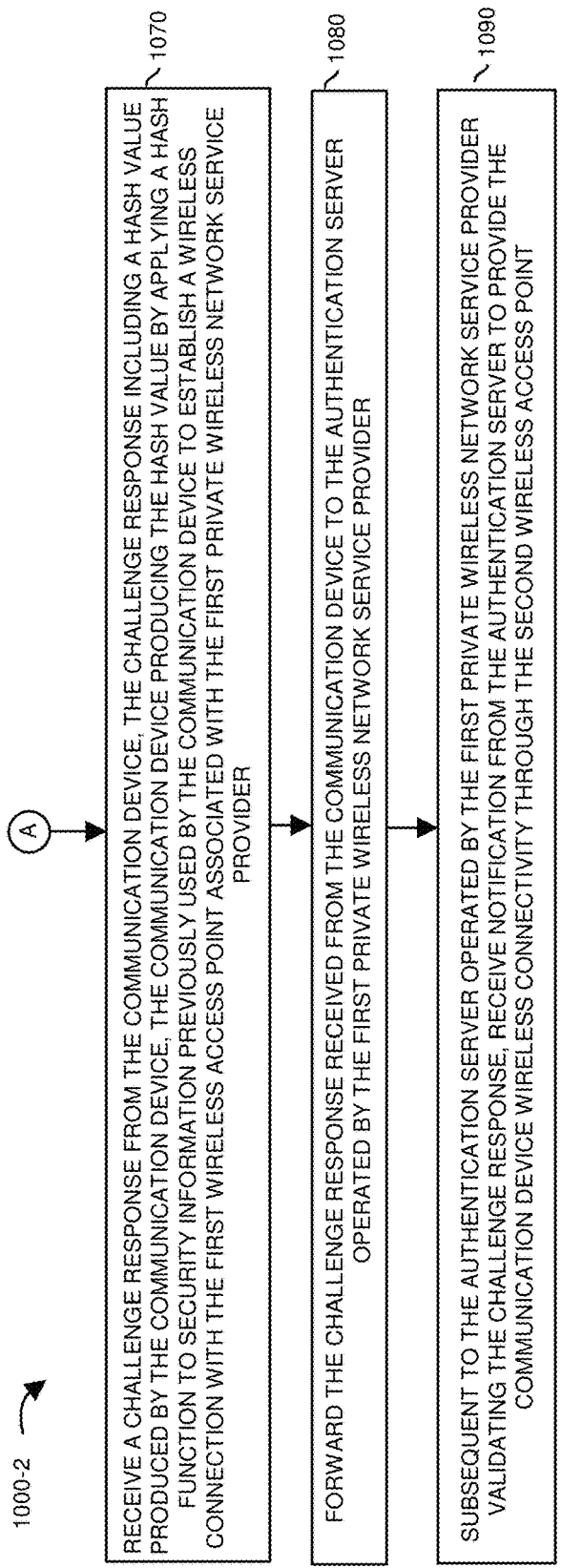

In processing operation 1070 and flowchart 1000-2 in FIG. 11, the wireless access point 105-2 receives a challenge response from the communication device 120-1. In one embodiment, the challenge response includes a session identifier value produced and/or obtained by the communication device 120-1. The communication device 120-1 provides the session identifier value based on security association information previously used by (associated with) the communication device to establish a wireless connection with the first wireless access point 105-1 (associated with the first private wireless network service provider TWX).

In processing operation 1080, the wireless access point 105-2 forwards the challenge response (such as including the session identifier value) received from the communication device 120-1 to the remote authentication server 150 operated by the first private wireless network service provider TWX.

In processing operation 1090, subsequent to the remote authentication server 150 operated by the first private wireless network service provider TWX validating the challenge response, the wireless access point 105-2 receives notification (authorization) from the remote authentication server 150 to provide the communication device 120-1 wireless connectivity (such as wireless communication link 128-2) through the wireless access point 105-2.

Note again that techniques herein are well suited for providing authentication resumption across different service providers' networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processing hardware in a user-operated communication device operated in a wireless network, performing operations of:
   storing security information generated during an association in which the user-operated communication device establishes a first communication session between the user-operated communication device and a first wireless access point in the wireless network, the first wireless access point operated by a first private wireless network service provider;
   identifying presence of a second wireless access point operated by a second private wireless network service provider; and
   utilizing the stored security information, which was previously used to connect the user-operated communication device to the first wireless access point, to wirelessly connect the user-operated communication device to the second wireless access point via a second communication session;
   wherein utilizing the stored security information further comprises:
      at the user-operated communication device: i) receiving a message from an authentication server in response to the user-operated communication device requesting to establish the second communication session with the second wireless access point; ii) in response to the message, communicating a unique identifier value derived from the stored security information in a response communication through the second wireless access point to the authentication server; and iii) receiving network access through the second wireless access point.

2. The method as in claim 1, wherein identifying presence of the second wireless access point includes: at the user-operated communication device, receiving notification from the second wireless access point, the notification indicating that the second private wireless network service provider provides wireless access to subscribers of the first private wireless network service provider.

3. The method as in claim 1 further comprising:
   receiving a message from the second wireless access point, the message indicating that the second wireless access point provides services on behalf of the second private wireless network service provider, the message indicating an identity and availability of the second wireless access point; and
   processing the received message to identify that the second wireless access point is available to provide wireless connectivity to the user-operated communication device.

4. The method as in claim 3 further comprising:
   generating a query to the second wireless access point, the query including a request of identities of different private wireless network service providers supported by the second wireless access point; and
   receiving a response to the query, the response indicating the different private wireless network service providers supported by the second wireless access point.

5. The method as in claim 4 further comprising:
   based on the response, generating a request to establish a wireless communication link with the second wireless access point;
   transmitting the request to the second wireless access point; and
   accessing the stored security information previously used to wirelessly connect the user-operated communication device to a first wireless access point.

6. The method as in claim 1, wherein utilizing the stored security information further comprises:
   obtaining a session identifier value, the session identifier value assigned to the first communication session between the user-operated communication device and the first wireless access point; and
   forwarding the session identifier value from the user-operated communication device to the second wireless access point, forwarding of the session identifier value establishing the second communication session, the second wireless access point in communication with an authentication server that verifies the session identifier value.

7. The method as in claim 6, wherein utilizing the stored security information further comprises:
   establishing the second communication session between the user-operated communication device and the second wireless access point subsequent to the authentication server performing authentication of the user-operated communication device using the session identifier value, the session identifier value derived from the stored security information, which was previously used to wirelessly connect the user-operated communication device to the first wireless access point.

8. The method as in claim 6, wherein utilizing the stored security information further comprises:
   establishing the second communication session between the user-operated communication device and the second wireless access point subsequent to the authentication server performing authentication of the user-operated communication device using the session identifier value.

9. The method as in claim 1, wherein the stored security information is an encryption key obtained during the association in which the user-operated communication device establishes the first communication session between the user-operated communication device and the first wireless access point in the wireless network.

10. The method as in claim 9, wherein utilizing the stored security information to wirelessly connect the user-operated communication device to the second wireless access point includes: re-using the encryption key to communicate between the user-operated communication device and the second wireless access point;
   wherein the first wireless access point is assigned a first SSID value; and
   wherein the second wireless access point is assigned a second SSID (Service Set Identifier) value, the first SSID value different than the second SSID value.

11. The method as in claim 1 further comprising:
storing expiration information indicating a duration of time in which the security information generated during the association is valid for use to establish a wireless communication link with the second wireless access point; and
generating a request to wirelessly connect the user-operated communication device to the second wireless access point in response to detecting that the stored security information is valid as indicated by the expiration information.

12. The method as in claim 1, wherein utilizing the stored security information to wirelessly connect the user-operated communication device to the second wireless access point includes:
communicating a message from the user-operated communication device to the second wireless access point, the message including a session identifier value assigned to the first communication session.

13. The method as in claim 12, wherein the user-operated communication device produces the session identifier value from the security information previously used by the user-operated communication device to establish the first communication session between user-operated communication device and the first wireless access point associated with the first private wireless network service provider.

14. The method as in claim 1, wherein utilizing the stored security information to wirelessly connect the user-operated communication device to the second wireless access point further comprises:
obtaining a session identifier value; and
forwarding the session identifier value from the user-operated communication device to the second wireless access point, the second wireless access point in communication with an authentication server operated by the first private wireless network service provider that verifies the session identifier value to establish the second communication session.

15. The method as in claim 1 further comprising:
at the user-operated communication device: receiving notification from the second wireless access point, the notification indicating that the second wireless access point is operated by the second private wireless network service provider and that the second wireless access point supports connectivity to users that subscribe to the first private wireless network service provider.

16. The method as in claim 15 further comprising:
communicating a request from the user-operated communication device to the second wireless access point, the request indicating to establish a wireless communication link based on services provided by the first private wireless network service provider, the request indicating an identity of the user-operated communication device; and
wherein the second wireless access point is operable to forward an authentication resumption request including an identity of the user-operated communication device to the authentication server to establish the second wireless communication session between the user-operated communication device and the second wireless access point.

17. The method as in claim 1 further comprising:
from the user-operated communication device, communicating a request generated by the user-operated communication device to use services provided by the first wireless network service provider, the request causing the second wireless access point to generate and forward an authentication resumption request message on behalf of the user-operated communication device to a remote authentication server.

18. The method as in claim 1, wherein utilizing the stored security information to wirelessly connect the user-operated communication device to the second wireless access point via the second communication session includes:
from the user-operated mobile communication device, initiating authentication resumption with the second wireless access point based on prior authentication of the user-operated communication device with the first wireless access point to establish the first communication session.

19. The method as in claim 18, wherein initiating authentication resumption with the second wireless access point includes:
notifying the second wireless access point that the user-operated communication device is a subscriber of the first wireless network service provider that requests to use wireless services on behalf of the first private wireless network service provider.

20. The method as in claim 19, wherein the initiated authentication resumption causes the second wireless access point to communicate with an authentication server of the first private wireless network service provider in which the user-operated communication device is authenticated to use the second wireless access point.

21. The method as in claim 1, wherein utilizing the stored security information to connect the user-operated communication device to the second wireless access point via the second communication session includes the user-operated communication device notifying the second wireless access point that the user-operated communication device is a subscriber of the first private wireless network service provider.

22. In a wireless network providing first wireless services from a first wireless access point associated with a first private wireless network service provider and second wireless services from a second wireless access point associated with a second private wireless network service provider, a method comprising:
via computer processing hardware associated with the second wireless access point operated in the wireless network, performing operations of:
transmitting wireless communications from the second wireless access point, the wireless communications indicating presence of the second wireless access point;
receiving a request from a communication device to establish a wireless connection with the second wireless access point;
from the second wireless access point, communicating with an authentication server operated by the first private wireless network service provider to verify prior authentication of the communication device for use of the second wireless access point by the communication device;
wherein communicating with the authentication server further comprises: i) forwarding a message on behalf of the communication device to the authentication server operated by the first private wireless network service provider, the message including an identity of the communication device, the message indicating that the communication device requests to establish a connection with the second wireless access point;

ii) forwarding a challenge generated by and received from the authentication server to the communication device;

the method further comprising: receiving a challenge response from the communication device, the challenge response including a session identifier value produced by the communication device, the communication device producing the session identifier value from the security information previously used by the communication device to establish a wireless connection with the first wireless access point associated with the first private wireless network service provider.

23. The method as in claim 22, wherein communicating with the authentication server further comprises:

forwarding the challenge response received from the communication device to the authentication server operated by the first private wireless network service provider; and subsequent to the authentication server operated by the first private wireless network service provider validating the challenge response, receiving notification from the authentication server to provide the communication device wireless connectivity through the second wireless access point.

24. The method as in claim 22, wherein communicating with the authentication server operated by the first private wireless network service provider includes:

receiving a communication produced by the communication device;

forwarding the communication to the authentication server; and in response to forwarding the communication, receiving notification from the authentication server operated by the first private wireless network service provider to provide the communication device wireless connectivity through the second wireless access point.

25. Computer-readable storage hardware having instructions stored thereon, the instructions, when carried out by computer processor hardware, cause the computer processor hardware to:

store security information generated during an association in which user-operated communication device establishes a first communication session between the user-operated communication device and a first wireless access point in the wireless network, the first wireless access point operated by a first private wireless network service provider;

identify presence of a second wireless access point operated by a second private wireless network service provider; and utilize the stored security information, which was previously used to connect the user-operated communication device to the first wireless access point, to wirelessly connect the user-operated communication device to the second wireless access point via a second communication session;

at the user-operated communication device: i) receive a message from an authentication server in response to the user-operated communication device requesting to establish the second communication session with the second wireless access point; ii) in response to the message, communicate a unique identifier value derived from the stored security information in a response communication through the second wireless access point to the authentication server; and iii) receiving network access through the second wireless access point.

26. A method comprising:

via computer processing hardware in a user-operated communication device operated in a wireless network, performing operations of:

storing security information generated during an association in which the user-operated communication device establishes a first communication session between the user-operated communication device and a first wireless access point in the wireless network, the first wireless access point operated by a first private wireless network service provider;

identifying presence of a second wireless access point operated by a second private wireless network service provider; and utilizing the stored security information, which was previously used to connect the user-operated communication device to the first wireless access point, to wirelessly connect the user-operated communication device to the second wireless access point via a second communication session;

wherein utilizing the stored security information to wirelessly connect the user-operated communication device to the second wireless access point includes: communicating a message from the user-operated communication device to the second wireless access point, the message including a session identifier value assigned to the first communication session;

wherein the user-operated communication device produces the session identifier value from the security information previously used by the user-operated communication device to establish the first communication session between user-operated communication device and the first wireless access point associated with the first private wireless network service provider; and wherein the second wireless access point is operable to forward the session identifier value to an authentication server operated by the first private wireless network service provider, the authentication server operated by the first private wireless network service provider to validate the session identifier value, the second wireless access point operable to receive notification from the authentication server to provide the user-operated communication device wireless connectivity through the second wireless access point.

27. A method comprising:

via computer processing hardware in a user-operated communication device operated in a wireless network, performing operations of:

storing security information generated during an association in which the user-operated communication device establishes a first communication session between the user-operated communication device and a first wireless access point in the wireless network, the first wireless access point operated by a first private wireless network service provider;

identifying presence of a second wireless access point operated by a second private wireless network service provider; and utilizing the stored security information, which was previously used to connect the user-operated communication device to the first wireless access point, to wirelessly connect the user-operated communication device to the second wireless access point via a second communication session; and wherein utilizing the stored security information further comprises:
at the user-operated communication device:
receiving a challenge from an authentication server in response to the user-operated communication device requesting to establish the second communication session; and
communicating the session identifier value in a challenge response through the second wireless access point to the authentication server.

28. The method as in claim 27, wherein the authentication server is operated by the first private wireless network service provider.

29. In a wireless network providing first wireless services from a first wireless access point associated with a first private wireless network service provider and second wireless services from a second wireless access point associated with a second private wireless network service provider, a method comprising:
via computer processing hardware associated with the second wireless access point operated in the wireless network, performing operations of:
transmitting wireless communications from the second wireless access point, the wireless communications indicating presence of the second wireless access point;
receiving a request from a communication device to establish a wireless connection with the second wireless access point;
from the second wireless access point, communicating with an authentication server operated by the first private wireless network service provider to verify prior authentication of the communication device for use of the second wireless access point by the communication device;
the method further comprising: receiving a message from the communication device at the second wireless access point, the message including a session identifier value assigned to a prior communication session between the communication device and the first wireless access point;
wherein the communication device produces the session identifier value from security information previously used by the communication device to establish the prior communication session between the first wireless access point and the communication device; and
the method further comprising: i) from the second wireless access point, forwarding the session identifier value received from the communication device to the authentication server operated by the first private wireless network service provider; and ii) subsequent to the authentication server operated by the first private wireless network service provider validating the communication device, receiving notification from the authentication server to provide the communication device wireless network connectivity through the second wireless access point.

30. A method comprising:
via computer processing hardware in a user-operated communication device operated in a wireless network, performing operations of:
storing security information generated during an association in which the user-operated communication device establishes a first communication session between the user-operated communication device and a first wireless access point in the wireless network, the first wireless access point operated by a first private wireless network service provider;
identifying presence of a second wireless access point operated by a second private wireless network service provider;
utilizing the stored security information, which was previously used to connect the user-operated communication device to the first wireless access point, to wirelessly connect the user-operated communication device to the second wireless access point via a second communication session; and
the method further comprising:
from the second wireless access point, forwarding a unique identifier value received from the user-operated communication device to an authentication server operated by the first private wireless network service provider; and
subsequent to the authentication server validating the user-operated communication device via the forwarded unique identifier value, at the second wireless access point, receiving notification from the authentication server to provide the user-operated communication device wireless network connectivity through the second wireless access point.

31. A method comprising:
via computer processing hardware in a user-operated communication device operated in a wireless network, performing operations of:
storing security information generated during an association in which the user-operated communication device establishes a first communication session between the user-operated communication device and a first wireless access point in the wireless network, the first wireless access point operated by a first private wireless network service provider;
identifying presence of a second wireless access point operated by a second private wireless network service provider;
utilizing the stored security information, which was previously used to connect the user-operated communication device to the first wireless access point, to wirelessly connect the user-operated communication device to the second wireless access point via a second communication session;
wherein the stored security information includes a unique identifier value provided to the user-operated communication device during authentication of the user-operated communication device to use the first wireless access point; and
wherein utilizing the stored security information to connect the user-operated communication device to the second wireless access point via the second communication session includes: at the user-operated communication device, i) deriving a message from the unique identifier value, and ii) communicating the message to the second wireless access point, the communicated message providing authentication of the user-operated communication device to use the second wireless access point.

* * * * *